(12) United States Patent
Kawakami (10) Patent No.: US 6,691,994 B2
(45) Date of Patent: Feb. 17, 2004

(54) HYDRAULIC LOCK DEVICE

(75) Inventor: Takayuki Kawakami, Itami (JP)

(73) Assignee: Pascal Kabushiki Kaisha, Hyogo (JP)

( * ) Notice: Subject to any disclaimer, the term of this patent is extended or adjusted under 35 U.S.C. 154(b) by 171 days.

(21) Appl. No.: 09/979,363

(22) PCT Filed: Mar. 21, 2001

(86) PCT No.: PCT/JP01/02266

§ 371 (c)(1),
(2), (4) Date: Feb. 13, 2002

(87) PCT Pub. No.: WO01/71199

PCT Pub. Date: Sep. 27, 2001

(65) Prior Publication Data

US 2003/0098539 A1 May 29, 2003

(30) Foreign Application Priority Data

Mar. 24, 2000 (JP) .......................................... 2000-84112

(51) Int. Cl.$^7$ ................................................. B23Q 3/00
(52) U.S. Cl. ..................... 269/309; 269/32; 269/310; 269/48.1; 279/2.1; 279/2.06
(58) Field of Search ................. 269/309, 310, 269/32, 48.1, 263, 252, 47, 50, 52, 91, 93–94; 279/2.06, 2.09, 2.1, 4.01; 92/163, 174

(56) References Cited

U.S. PATENT DOCUMENTS

| 4,909,493 | A | * | 3/1990 | Yonezawa | ..................... | 269/32 |
| 5,887,862 | A | * | 3/1999 | Yonezawa | ..................... | 269/310 |
| 5,957,443 | A | * | 9/1999 | Mascola | ..................... | 269/22 |
| 6,598,713 | B1 | * | 7/2003 | Kawakami | ..................... | 188/67 |

* cited by examiner

Primary Examiner—Joseph J. Hail, III
Assistant Examiner—Daniel Shanley
(74) Attorney, Agent, or Firm—Darby & Darby

(57) ABSTRACT

A hydraulic cylinder (4) moves a rod (3) in the direction of the axial center. The interior of a casing member (2) has an annular pressure booster (7) for pressurizing the oil in an external hydraulic chamber (6). The casing member (2) has a pressurized oil feed port (27) for feeding pressurized oil to the rod-moving hydraulic cylinder (4) and the input oil chamber (16) of the pressure booster (7). A throttle valve (8) is interposed in an oil supply channel extending from the pressurized oil feed port (27) to the input oil chamber (16). An oil discharge channel, extending from the input oil chamber (16) to the pressurized oil feed port (27), is provided with a nonreturn valve capable of discharging pressurized oil from the input oil chamber (16). The nonreturn valve (9) is opened when the pressurized oil is discharged through the pressurized oil feed port (27). The resulting hydraulic lock device is exceptionally dependable and reliable, operating at a high output with a small size and low-pressure hydraulic supply source.

19 Claims, 6 Drawing Sheets

HYDRAULIC LOCK DEVICE

FIELD OF THE INVENTION

The present invention relates to a hydraulic lock device in which an elastically deformable sleeve is elastically deformed by oil pressure to lock a rod. More particularly, the present invention relates to a structure in which high oil pressure is created by a pressure booster in a casing member to elastically deform the sleeve.

BACKGROUND OF THE INVENTION

A conventional hydraulic lock device, supporting a work by clamping or locking the work in an arbitrary position, is used when the work is cut or the like. Such hydraulic lock devices are disclosed, for example, in Japanese Published Unexamined Utility Models 59-128902 and 6-47710.

Japanese Published Unexamined Utility Model 59-128902 discloses a hydraulic lock device comprising a substantially cylindrical casing member, a hollow piston member slidably fitted into the casing member and designed to be elastically deformable to a smaller diameter, and a rod slidably fitted into the piston member and designed to pass through the casing member. This hydraulic lock device allows the piston member to be elastically deformed and pressed against the rod by the introduction of oil into a hydraulic chamber between the casing member and the piston member. In this state, the piston member and the locked rod prevent relative movement in the axial direction.

Japanese Published Unexamined Utility Model 6-47710 discloses a hydraulic lock device comprising a hydraulic cylinder having a cylinder main body and a piston member slidably fitted thereinto. A rod, passing through the cylinder main body, is inserted into the piston member while allowed to move axially in relation thereto. An elastically deformable sleeve is fitted over the rod between the piston member and the rod and mounted on the piston member while prevented to move in the axial direction in relation thereto.

This hydraulic lock device is operated when pressurized oil is introduced into the hydraulic chamber formed around the sleeve (which is part of the piston member). The sleeve is elastically deformed, pushed against the external peripheral surface of the rod, and locked to prevent the rod from moving relative to the piston member.

The present applicant has previously proposed a smaller hydraulic lock device capable of delivering higher output and using a smaller, lower-pressure hydraulic supply source. This hydraulic lock device is configured such that the interior of the casing member is provided with a pressure booster whose discharge portion is connected to an external hydraulic chamber, the external hydraulic chamber is sealably filled with oil, the pressure booster is actuated by the oil pressure input, an oil pressure greater than the oil pressure input is generated in the external hydraulic chamber, and the thin-walled cylindrical portion of the sleeve is deformed to a smaller diameter, thereby locking the rod. Another feature of this structure is that pressurized oil is fed through a single pressurized oil feed port to a rod-moving hydraulic cylinder. The pressurized oil is then guided into an oil channel passing through the input oil chamber of the pressure booster. The rod is locked by the pressure booster after being moved and pressed against the work by the rod-moving hydraulic cylinder through the use of the oil pressure input from the pressurized oil feed port.

The hydraulic lock devices disclosed in Japanese Published Unexamined Utility Models 59-128902 and 6-47710 are configured such that a sleeve separate from or integral with a piston member is elastically deformed by oil pressure to a smaller diameter. A rod is then locked by a static friction force acting between the sleeve and the rod.

With this structure, the locking force decreases when low oil pressure is used to elastically deform the sleeve. In view of this, a larger locking device is needed in order to generate a more powerful locking force, creating disadvantages in terms of equipment costs. Alternatively, high oil pressure must be obtained from the hydraulic supply source, making the hydraulic supply source bulkier, increasing the likelihood of hydraulic leaks, and incurring higher costs.

The hydraulic lock device of present applicant is configured with pressurized oil concurrently fed to the rod-moving hydraulic cylinder and the pressure booster through a common pressurized oil feed port. This, however, sometimes causing the pressure booster to start operating and to lock the rod while the rod has not yet attained sufficient mobility (that is, the rod has not yet come into contact with the work). This results in unacceptably low operating dependability or reliability.

OBJECTS AND SUMMARY OF THE INVENTION

It is an object of the present invention to provide a hydraulic lock device which overcomes the foregoing problems.

It is another object of the present invention to provide a hydraulic lock device with high dependability and reliability, reducing the size and increasing the output of the devices, and reducing the size and increasing the pressure of hydraulic supply sources.

The hydraulic lock device of the present invention comprises a rod as an output member, a sleeve with a thin-walled portion fittable over the rod and elastically deformable to a smaller diameter, a casing member for supporting the sleeve, and an external hydraulic chamber formed around the sleeve. This hydraulic lock device is characterized in that a rod-moving hydraulic cylinder is provided for moving the rod in the direction of the axial center. The interior of the casing member is provided with an annular pressure booster for pressurizing the oil in the external hydraulic chamber. The casing member is provided with a pressurized oil feed port for feeding pressurized oil to the rod-moving hydraulic cylinder and the input oil chamber of the pressure booster. A throttle valve is interposed in an oil supply channel extending from the pressurized oil feed port to the input oil chamber. An oil discharge channel, extending from the input oil chamber to the pressurized oil feed port, is provided with a nonreturn valve capable of discharging pressurized oil from the input oil chamber. The nonreturn valve is opened when the pressurized oil is discharged through the pressurized oil feed port.

The following is a description of a case in which a work to be machined is supported from below by a hydraulic lock device. The work is delivered to a point above the hydraulic lock device, and pressurized oil is fed from a hydraulic supply source to the pressurized oil feed port, whereupon the rod-moving hydraulic cylinder is actuated and the rod is moved upward. Pressurized oil is gradually fed, in a parallel fashion, to the input oil chamber of the pressure booster via the throttle valve. The pressure booster is actuated after the rod has completed its movement (that is, has come into contact with the work), and an oil pressure higher than the input oil pressure is generated in the external hydraulic chamber outside the sleeve. The thin-walled cylinder of the sleeve is thereby elastically deformed to a smaller diameter, securely locking the rod. The pressure booster is actuated by the pressurized oil input, and the oil inside the external hydraulic chamber of the sleeve is pressurized, making it possible to design a more powerful locking device without increasing the size of the device. Additionally, the hydraulic locking device of the present invention requires a more compact hydraulic supply source capable of operating at a lower pressure.

When, for example, the valve of the hydraulic supply source is switched and the pressurized oil is discharged through the pressurized oil feed port as the rod is returned to its original position after the work has been machined, or the like, the nonreturn valve is opened and pressurized oil is discharged from the input oil chamber of the pressure booster into the pressurized oil feed port via the oil discharge channel. As a result, the pressure booster returns to its original state, the thin-walled cylinder of the sleeve is expanded again, the locked state of the rod is canceled, and the rod is moved downward (for example, manually) while the drain-pressure oil of the rod-moving hydraulic cylinder is discharged.

In particular, the presence of the throttle valve in the oil feed channel between the pressurized oil feed port and the input oil chamber makes the rod-moving hydraulic cylinder operate more quickly than the pressure booster. This makes it possible to lock the rod after it has moved a sufficient distance (that is, has come into contact with the work) and allows the hydraulic lock device to operate with higher dependability and reliability. The presence of the nonreturn valve, which is opened when pressurized oil is discharged from the pressurized oil feed port, allows the pressure booster to be returned to its original condition with greater speed.

The throttle valve arrangement of the hydraulic lock device may be replaced with an arrangement in which an oil channel, extending from the pressurized oil feed port to the input oil chamber, is provided with a sequence valve that is opened against the elastic force of a valve-closing spring after the oil pressure inside the pressurized oil feed port has risen to a prescribed level. An oil discharge channel, extending from the input oil chamber to the pressurized oil feed port, is provided with a nonreturn valve capable of discharging pressurized oil from the input oil chamber. The nonreturn valve is opened when the pressurized oil is discharged through the pressurized oil feed port.

Adopting a structure in which a sequence valve is provided to the oil channel between the pressurized oil feed port and the input oil chamber, and the valve is opened against the elastic force of the valve-closing spring after the oil pressure inside the pressurized oil feed port has risen to a prescribed level, allows the rod to be locked after it has moved a sufficient distance (that is, has come into contact with the work). Such a hydraulic lock device operates with higher dependability and reliability.

Incorporating the sequence valve into the valve body of the nonreturn valve makes it possible to simplify the structure of the hydraulic lock device, to reduce the required number of parts, to curtail the manufacturing costs, and to make the locking device more compact.

The sequence valve may also comprise a ball-shaped valve body and a valve seat formed in the oil channel (which extends from the pressurized oil feed port and the input oil chamber) and closed in conjunction with the valve body. The valve body is pressed against the valve seat, and the sequence valve is closed by the valve-closing spring and the oil pressure of the pressurized oil feed port when pressurized oil is fed through the pressurized oil feed port. When the rod is returned to its retracted position, the pressurized oil is discharged through the pressurized oil feed port, the valve body moves away from the valve seat against the urging force of the valve-closing spring, and the sequence valve is opened.

The pressure booster may also comprise a piston member for receiving pressurized oil from the input oil chamber and increasing the oil pressure of the external hydraulic chamber. The pressure-receiving area of the piston member on the side of the input oil chamber may be set greater than the pressure area facing the external hydraulic chamber. In this case, the oil pressure applied to the input oil chamber through the pressurized oil feed port is increased by the pressure booster in proportion to the pressure-receiving area ratio. The pressurized oil in the external hydraulic chamber is additionally pressurized to provide an enhanced pressurization effect on the external periphery, securely locking the rod.

The rod-moving hydraulic cylinder may also comprise a spring for elastically urging the rod toward an advance side such that the rod is driven to the advance side and pressed against the rod by this spring.

The rod-moving hydraulic cylinder may further comprise a return spring for urging the piston member to a retraction side, in which case the rod is returned to the retraction side by the spring after the lock on the work has been released.

The above, and other objects, features and advantages of the present invention will become apparent from the following description read in conjunction with the accompanying drawings, in which like reference numerals designate the same elements.

DETAILED DESCRIPTION OF THE INVENTION

Embodiments of the present invention will now be described with reference to the accompanying drawings.

Referring to FIGS. 1 through 5, the present embodiment is an example in which the present invention is adapted to a work support device. Specifically, a hydraulic lock device 1 of the present embodiment is a work support device designed to support the central portion of a work W from below, preventing work W from vibrating during cutting.

Figure 1:
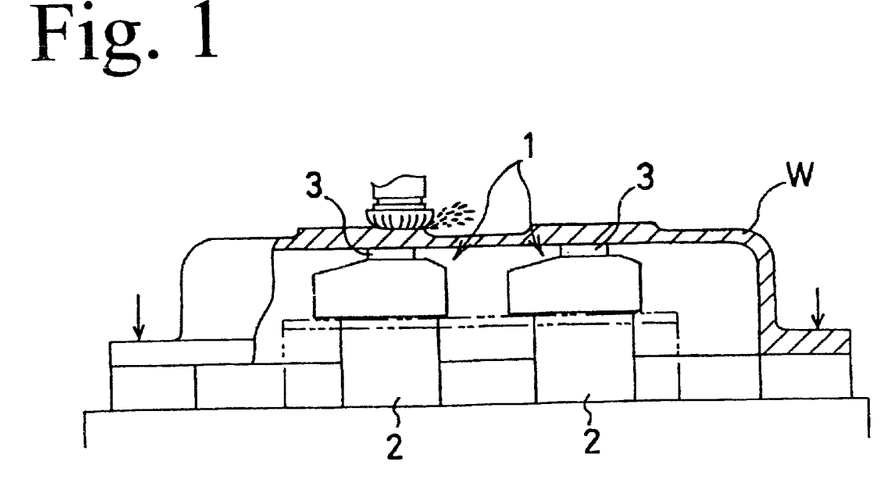
FIG. 1 is a cutaway front view of an example in which the hydraulic lock device of the present invention is adapted to a work support.
Figure 2:
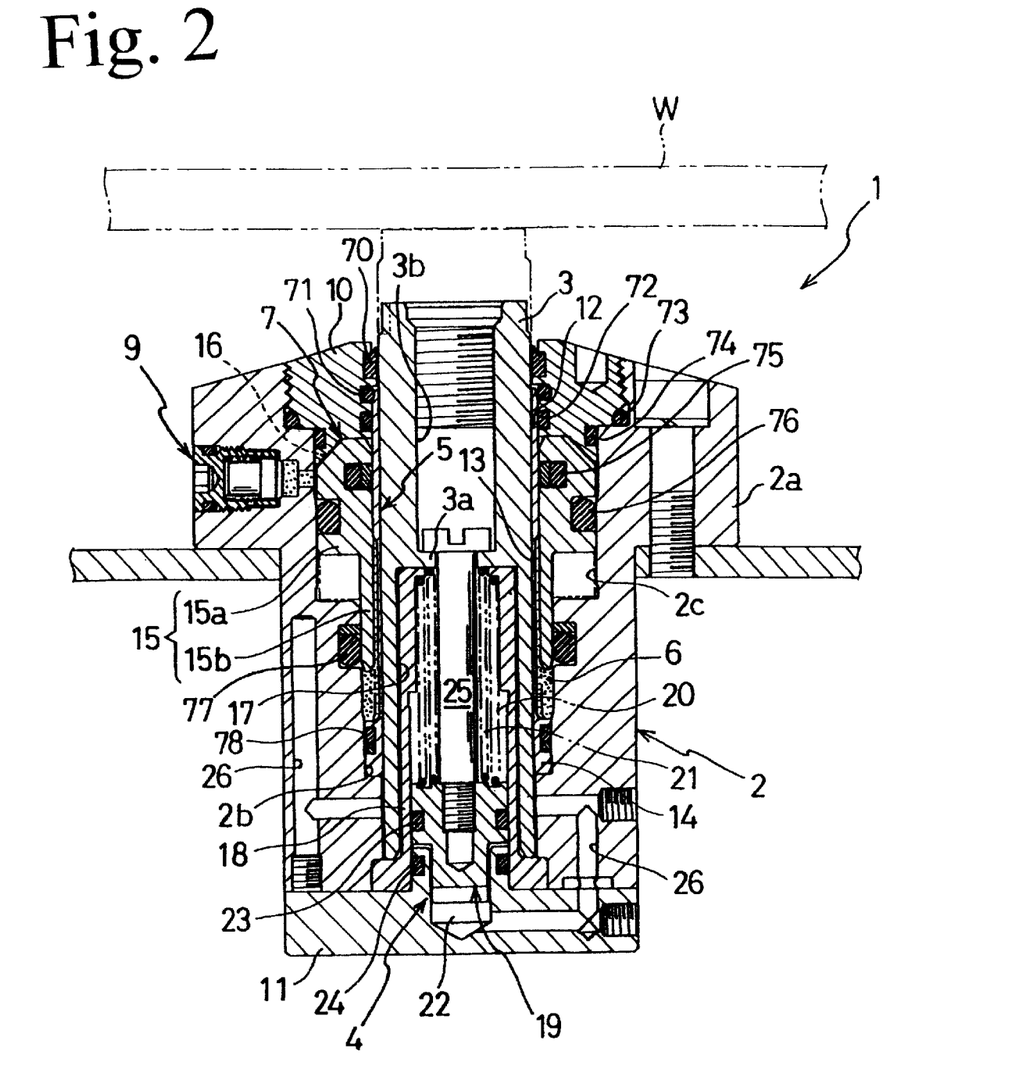
FIG. 2 is a longitudinal section of the hydraulic lock device shown in FIG. 1.
Figure 3:
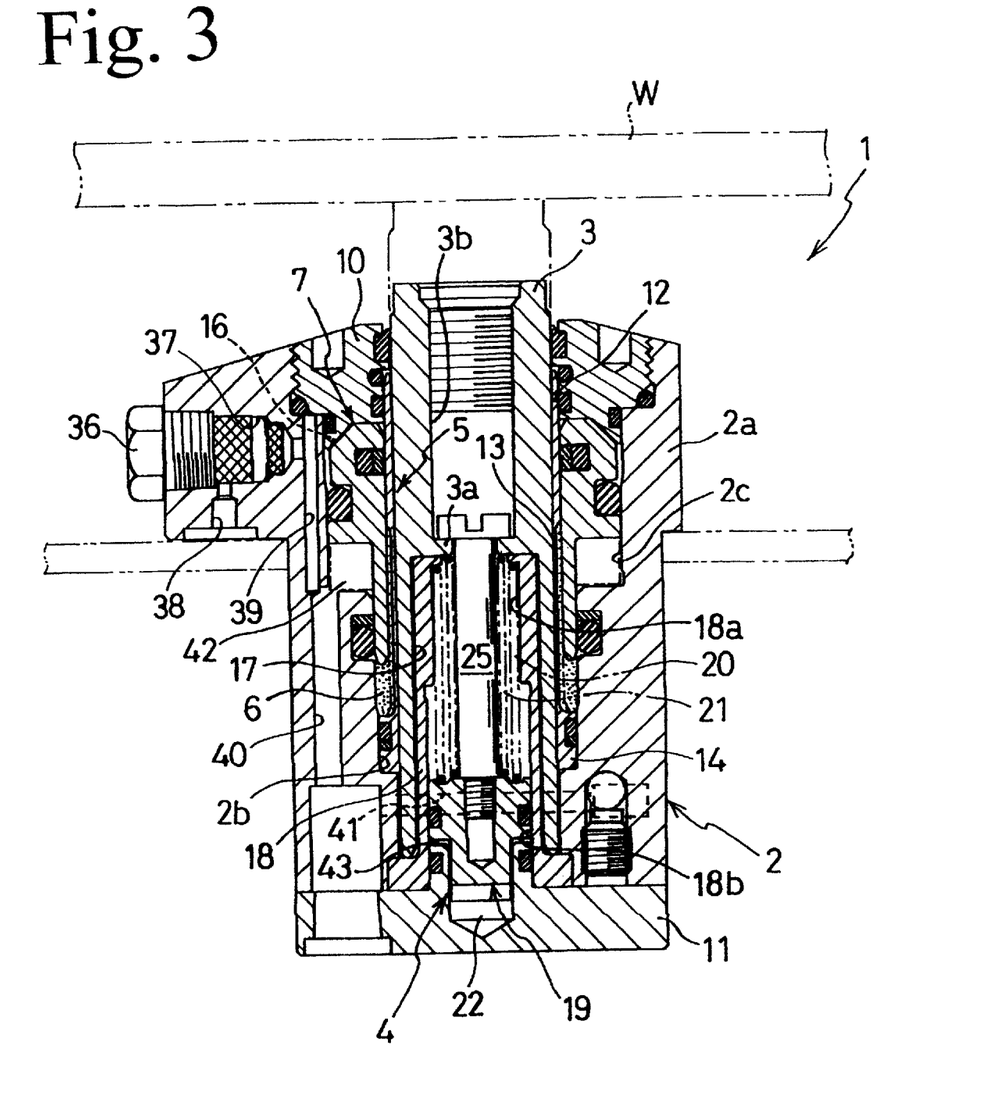
FIG. 3 is a longitudinal section of the hydraulic lock device shown in FIG. 1.

Hydraulic lock device 1 comprises a substantially cylindrical casing member 2 that is open to the outside in the direction from the bottom end to the top. A rod 3 functions as an output member. Hydraulic lock device further includes a rod-moving hydraulic cylinder 4, a metal sleeve 5, an external hydraulic chamber 6, a pressure booster 7, a throttle valve 8, and a nonreturn valve 9.

Casing member 2 will first be described. A rectangular (when viewed in a plane) flange 2a and a rod-receiving hole 2b for rod 3 are formed over about a third of length of casing member 2 in the upper portion thereof. A piston-receiving hole 2c, whose diameter is greater than that of rod-receiving hole 2b, is formed over about half of the area inside casing member 2 in the upper portion thereof. An annular lid portion 10 is threadably mated with the top end of the casing member 2 to allow a lid to be removably placed over piston-receiving hole 2c. The bottom end of casing member 2 is closed with a bottom plate member 11, yielding a cylindrical bottomed structure.

Sleeve 5 will now be described. Sleeve 5 is provided with, in order from top to bottom, a fixed ring top 12, a thin-walled cylinder 13, and a fixed ring bottom 14. Fixed ring top 12, thin-walled cylinder 13, and fixed ring bottom 14 are integrated together. Fixed ring top 12 is immovably mounted on lid portion 10 of casing member 2. Fixed ring bottom 14 is immovably mounted over rod-receiving hole 2b of casing member 2. In particular, thin-walled cylinder 13 is designed such that it can be elastically deformed to a smaller diameter. An annular external hydraulic chamber 6 is formed around thin-walled cylinder 13, and external hydraulic chamber 6 is sealably filled with oil. Piston-receiving hole 2c accommodates an annular piston member 15 fitted over sleeve 5.

Rod 3 and rod-moving hydraulic cylinder 4 will now be described. The area near the axial center of rod 3 is provided with a cylindrical hole 17, extending from the bottom end over about half the total length of rod 3. A cylindrical member 18 is fitted into cylindrical hole 17. A flange is formed facing the bottom end of cylindrical member 18, which is provided with a spring-receiving hole 18a and a cylindrical hole 18b. An opening is formed in the top end of cylindrical member 18. The flange is fixed in place by being secured between bottom plate member 11 and casing member 2. Cylindrical hole 18b of cylindrical member 18 is provided with a spring-loaded piston member 19 capable of sliding over a specific stroke distance. Spring-receiving hole 18a houses two compression springs 20 and 21.

The bottom ends of compression springs 20 and 21 are received by spring-loaded piston member 19. The top end of external spring 20 is received by the upper plate of cylindrical member 18. The top end of inner spring 21 passes through the opening in cylindrical member 18 to be received by an intermediate wall 3a near the middle level of rod 3. Spring-loaded piston member 19 has a wide portion and a narrow portion. The wide portion is slidably mounted on cylindrical hole 18b, and the narrow portion is slidably mounted in an oil hole formed in bottom plate member 11, defining hydraulic chamber 22 of rod-moving hydraulic cylinder 4. Sealing members 23 and 24 are also provided.

An upright bolt 25, screwed into spring-loaded piston member 19, is configured to move in the vertical direction integrally with bolt 25 and spring-loaded piston member 19. Bolt 25 goes inside compression springs 20 and 21 and passes through intermediate wall 3a. The head thereof is inserted while allowed to move vertically in relation to an opening 3b above intermediate wall 3a. An oil channel 26, for feeding pressurized oil to hydraulic chamber 22, is provided to bottom plate member 11 and the wall interior of casing member 2, between a pressurized oil feed port 27 and hydraulic chamber 22 (see FIG. 2). Pressurized oil is fed to hydraulic chamber 22 from pressurized oil feed port 27 when rod-moving hydraulic cylinder 4 is actuated, whereby spring-loaded piston member 19 moves upward. The urging force of spring 21 is transmitted to intermediate wall 3a of rod 3, causing rod 3 to move upward and press against work W.

Pressure booster 7 will now be described. Pressure booster 7 comprises an annular piston member 15 and an annular input oil chamber 16. Piston member 15 comprises an annular wide portion 15a, extending over about half the member as a top portion, and an annular narrow portion 15b, extending over half the member as a bottom portion. Wide portion 15a and narrow portion 15b are formed in a coaxial fashion. Wide portion 15a slidably fits into piston-receiving hole 2c and slidably fits over sleeve 5. In addition, narrow portion 15b slidably fits into rod-receiving hole 2b, blocks the top end of external hydraulic chamber 6, and allows the oil in external hydraulic chamber 6 to be compressed.

Input oil chamber 16 of pressure booster 7 is defined by the bottom surface of lid portion 10, piston-receiving hole 2c, the upper surface of wide portion 15a constituting piston member 15, and the external peripheral surface of sleeve 5. The upper interior portion of casing member 2 is provided with a connector 28 and a pressurized oil feed port 27 for feeding pressurized oil from the outside to input oil chamber 16. In this structure, the pressure area of the bottom surface belonging to narrow portion 15b is reduced to about ⅓ to ⅕ of the pressure-receiving area on the top surface of wide portion 15a to increase the oil pressure of external hydraulic chamber 6 to a level about 3 to 5 times higher than the oil pressure of input oil chamber 16.

Throttle valve 8 will now be described. An oil feed channel 29 leads from pressurized oil feed port 27 to input oil chamber 16 of pressure booster 7. Throttle valve 8 screws into oil feed channel 29. Throttle valve 8 has a throttle valve body in which a thin throttling channel 8a is formed in the direction of the axial center along the entire valve. The valve is designed such that rod-moving hydraulic cylinder 4 is actuated and pressure booster 7 operated after movement of rod 3 upward is completed.

Figure 5:
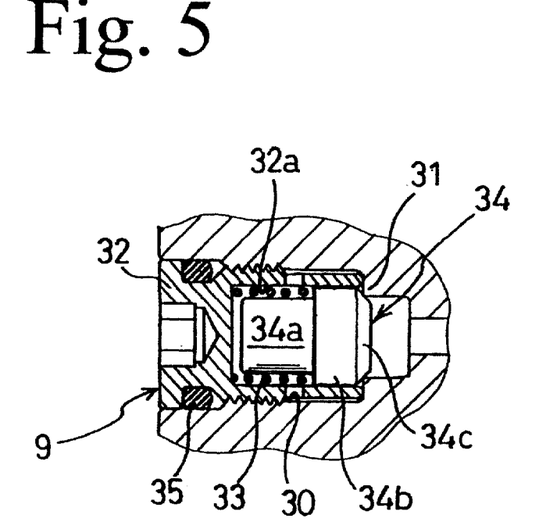
FIG. 5 is an enlarged fragmentary cross-sectional view of a nonreturn valve.

Nonreturn valve 9 will now be described. Nonreturn valve 9 is provided to a sufficiently wide oil discharge channel 30, originating at input oil chamber 16 and extending all the way to pressurized oil feed port 27, forming a structure in which pressurized oil can be discharged from input oil chamber 16. Specifically, nonreturn valve 9 comprises a valve casing 32, fitted into the oil channel formation hole of oil discharge channel 30, a valve body 34, movably housed in a valve-receiving hole 32a formed in valve casing 32, a valve seat 31, formed in the stepped portion of oil discharge channel 30, and a compression spring 33, for urging valve body 34 toward valve seat 31.

Valve body 34 has a narrow portion 34a, a wide portion 34b, and a tapered valve portion 34c connected to wide portion 34b. The valve body is configured such that when pressurized oil is fed to pressurized oil feed port 27, valve portion 34c presses against valve seat 31 by the oil pressure of valve-receiving hole 32a and the urging force of compression spring 33, the valve remains closed, the flow of oil from pressurized oil feed port 27 to input oil chamber 16 is stopped, and the pressurized oil is no longer discharged from input oil chamber 16. In this structure, valve portion 34c moves away from valve seat 31 against the urging force of spring 33. Nonreturn valve 9 is opened when, for example, the valve of the hydraulic supply source is switched and pressurized oil is discharged through pressurized oil feed port 27 after machining is completed. Sealing member 35 is provided to give an appropriate seal.

Figure 4:
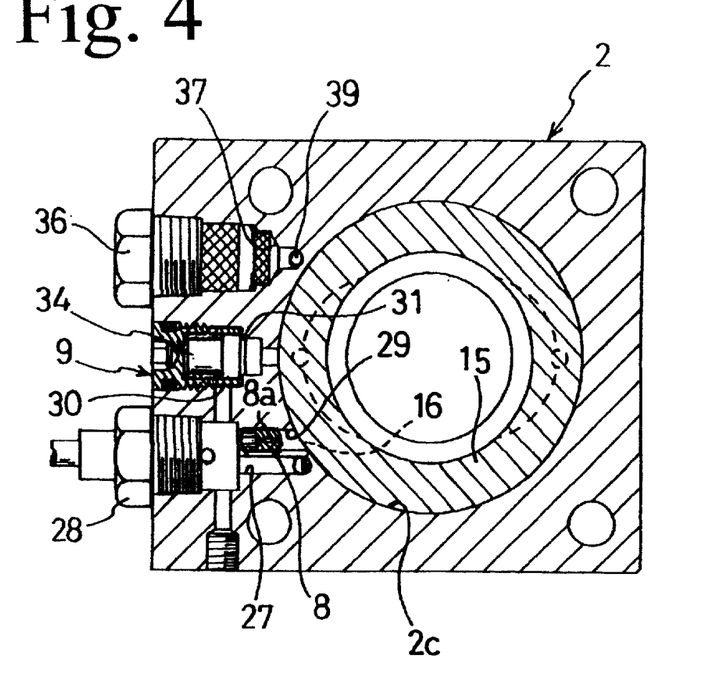
FIG. 4 is a cross-sectional view depicting the arrangement of an aspiration channel and an oil channel in the casing member.

The top portion of casing member 2 is provided with a filter, a connector 36, a port 37, an aspiration hole 38, and aspiration channels 39, 40, and 41. These components are used to feed oil to operation chambers 42 and 43 as well as to provide aspirating action for the operating chamber at the bottom end of rod 3 by the raising and lowering of rod 3. Operation chamber 42 is an annular space defined by the lower surface of wide portion 15a constituting piston member 15, piston-receiving hole 2c, and the external peripheral surface of narrow portion 15b. Operation chamber 43 is an annular space defined by the lower surface of the wide portion constituting spring-loaded piston member 19, cylindrical member 18, the upper surface of the projection on bottom plate member 11, and the narrow portion of spring-loaded piston member 19. Sealing members 70–78 are also provided to give an appropriate seal.

The actions and effects of hydraulic lock device 1 will now be described.

When a work W, designated for machining, is to be supported from below by hydraulic lock device 1, work W is delivered and fixed with a clamp device at a point above hydraulic lock device 1. Pressurized oil is fed from the hydraulic supply source to pressurized oil feed port 27, whereupon rod-moving hydraulic cylinder 4 is actuated and rod 3 moves upward. Pressurized oil is gradually fed in parallel fashion to input oil chamber 16 of pressure booster 7 via throttle valve 8. Pressure booster 7 is actuated after rod 3 contacts work W. An oil pressure higher than the input oil pressure is generated in external hydraulic chamber 6 outside sleeve 5. Thin-walled cylinder 13 of sleeve 5 is thereby elastically deformed to a smaller diameter, securely locking rod 3. Pressure booster 7 is actuated by the pressurized oil input, and the oil inside external hydraulic chamber 6 of sleeve 5 is pressurized, making it possible to design a more powerful locking device without increasing the size of the device. Furthermore, the hydraulic locking device of the present invention is designed to use a more compact hydraulic supply source capable of operating at a lower pressure.

For example, the oil in external hydraulic chamber 6 can be pressurized to a level about four times greater than the input oil pressure by selecting a value of 4:1 for the ratio of the pressure-receiving area on the upper surface of wide portion 15a, constituting piston member 15, and the pressure area on the lower surface of narrow portion 15b.

Nonreturn valve 9 is opened and the pressurized oil in input oil chamber 16 of pressure booster 7 is discharged into pressurized oil feed port 27 via oil discharge channel 30 when the valve of the hydraulic supply source is switched. Pressurized oil is discharged through pressurized oil feed port 27 as rod 3 is returned to a retracted position after work W has been machined. As a result, pressure booster 7 returns to its original state, thin-walled cylinder 13 of sleeve 5 is expanded again, the locked state of rod 3 is canceled, the drain-pressure oil of rod-moving hydraulic cylinder 4 is discharged, and rod 3 moves downward by the urging force of spring 20.

In particular, the presence of throttle valve 8 in oil feed channel 29 between pressurized oil feed port 27 and input oil chamber 16 makes rod-moving hydraulic cylinder 4 operate more quickly than pressure booster 7, making it possible to lock rod 3 after it contacts work W and to allow hydraulic lock device 1 to operate with higher dependability and reliability. The presence of nonreturn valve 9, which is opened when pressurized oil is discharged from pressurized oil feed port 27, allows pressure booster 7 to return to its original condition with greater speed.

Following is a description of a hydraulic lock device 1A pertaining to an embodiment obtained by the partial modification of the embodiment described above. Members identical or similar to those described with reference to the above embodiment will be labeled in the same manner and omitted from the description.

Figure 6:
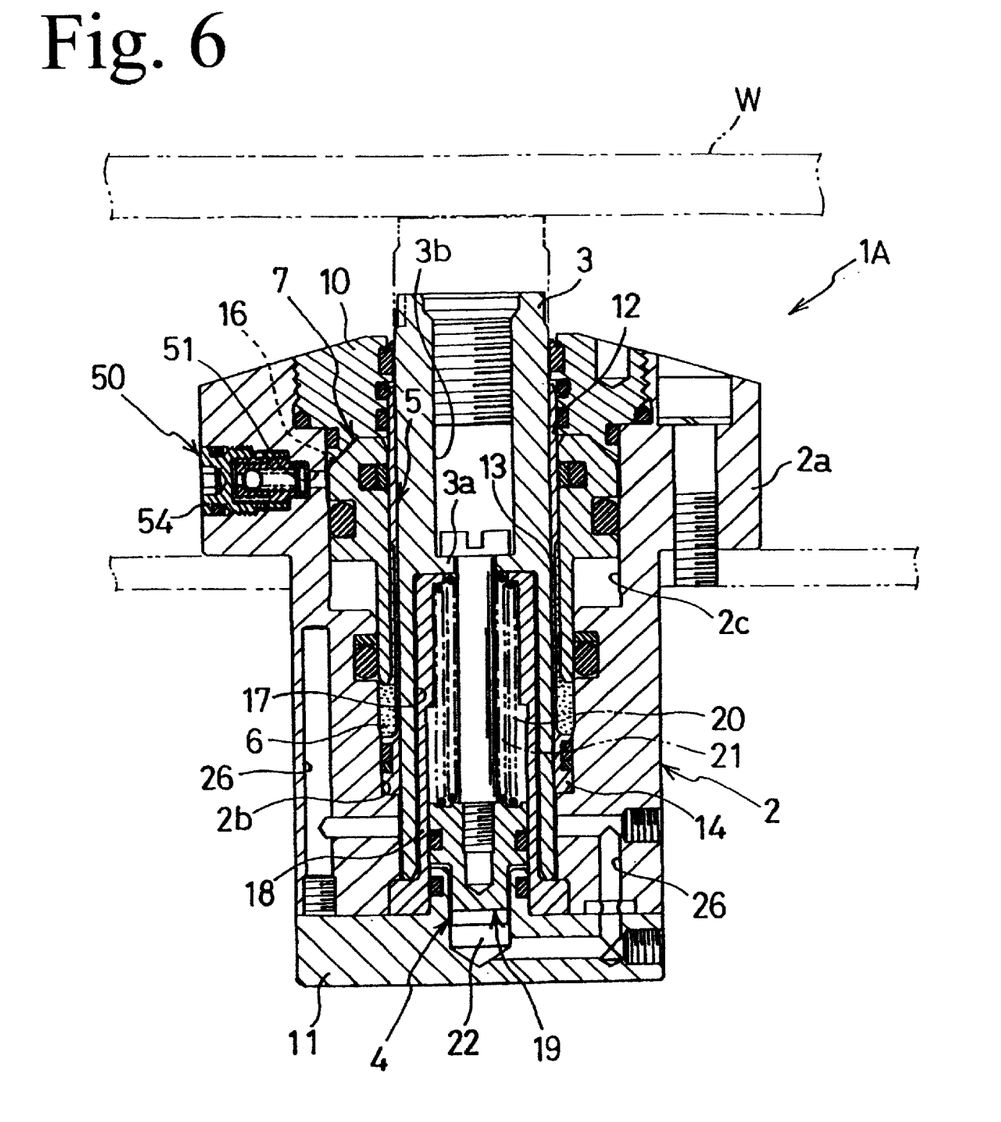
FIG. 6 is a longitudinal section of a hydraulic lock device pertaining to a modified embodiment of the present invention.
Figure 7:
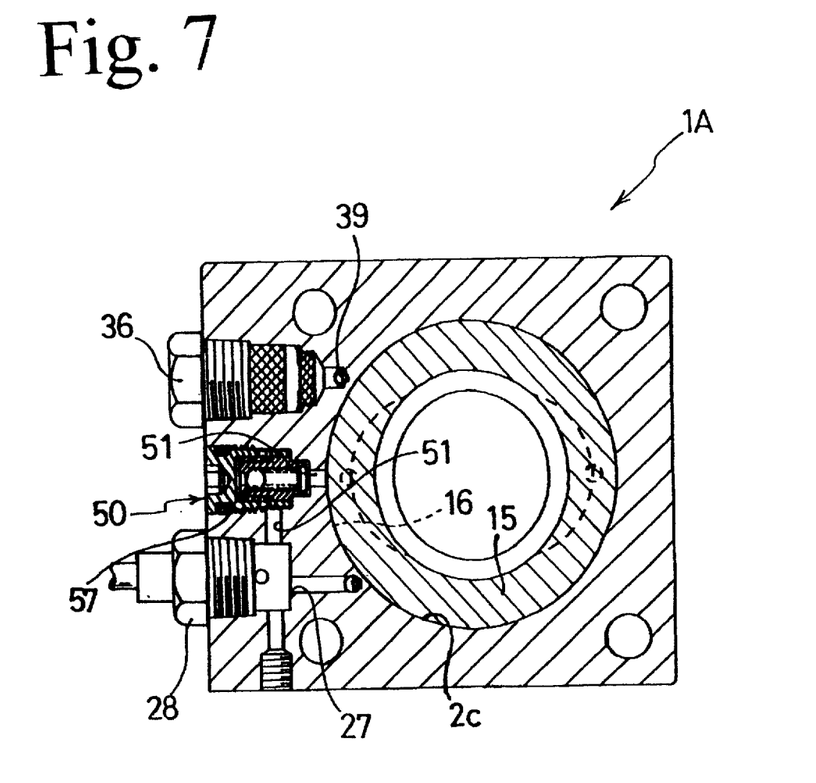
FIG. 7 is a drawing corresponding to FIG. 6 and depicting the modified embodiment.
Figure 8:
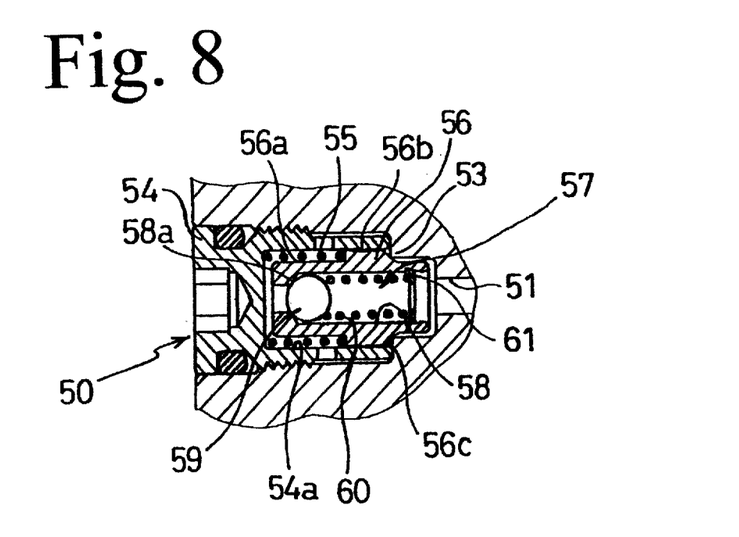
FIG. 8 is an enlarged fragmentary cross-sectional view of a nonreturn valve and a sequence valve.

Referring to FIGS. 6 through 8, a nonreturn valve 50 and a sequence valve 57 are provided to an oil channel 51 extending between an input oil chamber 16 and a pressurized oil feed port 27. In this structure, pressurized oil is discharged from input oil chamber 16 via oil channel 51 and nonreturn valve 50 during a process in which pressurized oil is discharged from pressurized oil feed port 27.

Nonreturn valve 50 comprises a valve casing 54, fitted into the oil channel formation hole of oil channel 51, a valve body 56, movably housed in a valve-receiving hole 54a inside valve casing 54, a valve seat 53, formed in the stepped portion of oil channel 51, and a compression spring 55, for urging valve body 56 toward valve seat 53. Valve body 56 has a narrow portion 56a, a wide portion 56b, and a tapered valve portion 56c connected to wide portion 56b. Valve body 56 is configured such that when pressurized oil is fed to pressurized oil feed port 27, valve portion 56c presses against valve seat 53 by the oil pressure of valve-receiving hole 54a and the urging force of compression spring 55, the valve remains closed, the flow of oil from pressurized oil feed port 27 to input oil chamber 16 is stopped, and the pressurized oil is no longer discharged from input oil chamber 16. In this structure, valve portion 56c moves away from valve seat 53 against the urging force of spring 55. Nonreturn valve 50 is opened when, for example, the valve of the hydraulic supply source is switched and pressurized oil is discharged through pressurized oil feed port 27 after machining is completed.

A description will now be given with reference to a case in which a sequence valve 57 is substituted for throttle valve 8. Sequence valve 57 comprises a valve body 56, a ball valve body 59 movably housed in valve body 56, a valve seat 58a formed inside an oil channel 58, a valve-closing spring 60 for urging ball valve body 59 toward valve seat 58a, and a retaining ring 61 for keeping valve-closing spring 60 inside the valve body 56. Rod-moving hydraulic cylinder 4 is actuated, rod 3 moves upward, the movement is completed, and the oil pressure inside pressurized oil feed port 27 is raised to a prescribed level. Sequence valve 57 is then opened against the elastic force of valve-closing spring 60. The rest of the structure is substantially the same as in the previously described embodiment.

The actions and effects of hydraulic lock device 1A will now be described.

When a work W designated for machining is to be supported from below by hydraulic lock device 1A, work W is delivered and fixed with a clamp device at a point above hydraulic lock device 1A. Pressurized oil is fed from the hydraulic supply source through pressurized oil feed port 27, whereupon rod-moving hydraulic cylinder 4 is actuated and rod 3 moves upward. Rod 3 is presses against work W, and the oil pressure inside pressurized oil feed port 27 increases to the pressure. level of supplied oil, whereupon sequence valve 57 is opened against the elastic force of valve-closing spring 60. Pressurized oil is then fed to input oil chamber 16 of pressure booster 7 to actuate pressure booster 7. Rod 3 is securely locked in the same manner as in the previously described embodiment. Locking device 1A is rendered more powerful without being made bulkier, and the hydraulic supply source is designed as a smaller device operating at a lower pressure.

Nonreturn valve 50 is opened, and pressurized oil is discharged from input oil chamber 16 into pressurized oil feed port 27 via oil channel 51 when the valve of the hydraulic supply source is switched and pressurized oil is discharged through pressurized oil feed port 27 as rod 3 is returned to a retracted position after work W has been machined. As a result, pressure booster 7 returns to its original state, thin-walled cylinder 13 of sleeve S returns to a larger diameter, the locked state of rod 3 is canceled, the drain-pressure oil of rod-moving hydraulic cylinder 4 is discharged, and rod 3 moves downward by the urging force of springs 20 and 21.

In particular, adopting a structure in which sequence valve 57 is provided to oil channel 51 between pressurized oil feed port 27 and input oil chamber 16, and the valve is opened against the elastic force of valve-closing spring 60 after the oil pressure inside pressurized oil feed port 27 has risen to a prescribed level, makes rod-moving hydraulic cylinder 4 operate more quickly than pressure booster 7. This makes it possible to lock rod 3 after it has moved a sufficient distance (that is, has come into contact with work W). Hydraulic lock device 1A operates with higher dependability and reliability.

The return operation of pressure booster 7 is accelerated by the presence of nonreturn valve 50, which opens when pressurized oil is discharged from pressurized oil feed port 27. Incorporating sequence valve 57 into valve body 56 of nonreturn valve 50 makes it possible to simplify the structure of hydraulic lock device 1A, to reduce the number of parts, to curtail the manufacturing costs, and to make the locking device more compact.

The following is a description of embodiments obtained by the partial modification of the embodiment described above.

1) The sequence valve does not necessarily have to be incorporated into valve body 56 of nonreturn valve 50. The sequence valve may be configured as a structure that is separate from nonreturn valve 50.

2) Although sleeve 5 is made of metal (preferably steel), the material options are not limited to metals and include materials such as FRP. Although the above embodiments were described with reference to cases in which the present invention was adapted to a hydraulic lock device as a work support device, it is also possible to adapt the present invention to hydraulic lock devices for various machine tools or industrial machinery. The above-described embodiment can also be modified in a variety of ways as long as the essence of the present invention is not compromised.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A hydraulic lock device, comprising:
   a rod;
   a sleeve having a thin-walled portion fittable over said rod, said sleeve being elastically deformable to a smaller diameter;
   a casing member supporting said sleeve;
   an external hydraulic chamber being formed around said sleeve
   a rod-moving hydraulic cylinder moving said rod in a direction of an axial center thereof;
   an annular pressure booster, on an interior of said casing member, for pressurizing oil in said external hydraulic chamber;
   an input oil chamber communicating with said pressure booster;
   a pressurized oil feed port in said casing member for feeding pressurized oil to said rod-moving hydraulic cylinder and said input oil chamber of said pressure booster;
   an oil supply channel extending from said pressurized oil feed port to said input oil chamber;
   a throttle valve interposed in said oil supply channel;
   an oil discharge channel extending from said input oil chamber to said pressurized oil feed port;
   a nonreturn valve, in said oil discharge channel, capable of discharging pressurized oil from said input oil chamber; and
   said nonreturn valve being opened when pressurized oil is discharged through said pressurized oil feed port.

2. The hydraulic lock device as defined in claim 1, wherein said pressure booster comprises:
   a piston member receiving pressurized oil from said input oil chamber, increasing an oil pressure of said external hydraulic chamber; and
   a pressure-receiving area of said piston member on a side of said input oil chamber is set greater than a pressure area facing said external hydraulic chamber.

3. The hydraulic lock device as defined in claim 1, wherein said rod-moving hydraulic cylinder comprises a spring elastically urging said rod toward an advance side thereof.

4. The hydraulic lock device as defined in claim 1, wherein said rod-moving hydraulic cylinder comprises a return spring urging said piston member to a retraction side thereof.

5. A hydraulic lock device, comprising:
   a rod;
   a sleeve having a thin-walled portion fittable over said rod, said sleeve being elastically deformable to a smaller diameter;
   a casing member supporting said sleeve;
   an external hydraulic chamber being formed around said sleeve;
   a rod-moving hydraulic cylinder moving said rod in a direction of an axial center;
   an annular pressure booster, on an interior of said casing member, pressurizing oil in said external hydraulic chamber;
   a pressurized oil feed port, in said casing member, feeding pressurized oil to said rod-moving hydraulic cylinder and said input oil chamber of said pressure booster;
   an oil channel extending from said pressurized oil feed port to said input oil chamber;
   a sequence valve in said oil channel being opened against an elastic force of a valve-closing spring after oil pressure in said pressurized oil feed port has risen to a prescribed level;
   an oil discharge channel extending from said input oil chamber to said pressurized oil feed port;

a nonreturn valve, in said oil discharge channel, capable of discharging pressurized oil from said input oil chamber; and said nonreturn valve being opened when pressurized oil is discharged through said pressurized oil feed port.

6. The hydraulic lock device as defined in claim 5, further comprising a sequence valve incorporated into a valve body of said nonreturn valve.

7. The hydraulic lock device as defined in claim 6, wherein said sequence valve comprises a ball-shaped valve body and a valve seat formed in said oil channel, being closed in conjunction with said valve body.

8. The hydraulic lock device as defined in claim 7, wherein said pressure booster comprises:

a piston member receiving pressurized oil from said input oil chamber, increasing an oil pressure of said external hydraulic chamber; and a pressure-receiving area of said piston member on a side of said input oil chamber is set greater than a pressure area facing said external hydraulic chamber.

9. The hydraulic lock device as defined in claim 7, wherein said rod-moving hydraulic cylinder comprises a spring elastically urging said rod toward an advance side thereof.

10. The hydraulic lock device as defined in claim 7, wherein said rod-moving hydraulic cylinder comprises a return spring urging said piston member to a retraction side thereof.

11. The hydraulic lock device as defined in claim 6, wherein said pressure booster comprises:

a piston member receiving pressurized oil from said input oil chamber, increasing an oil pressure of said external hydraulic chamber; and a pressure-receiving area of said piston member on a side of said input oil chamber is set greater than a pressure area facing said external hydraulic chamber.

12. The hydraulic lock device as defined in claim 6, wherein said rod-moving hydraulic cylinder comprises a spring elastically urging said rod toward an advance side thereof.

13. The hydraulic lock device as defined in claim 6, wherein said rod-moving hydraulic cylinder comprises a return spring urging said piston member to a retraction side thereof.

14. The hydraulic lock device as defined in claim 5, wherein said pressure booster comprises:

a piston member receiving pressurized oil from said input oil chamber, increasing an oil pressure of said external hydraulic chamber; and a pressure-receiving area of said piston member on a side of said input oil chamber is set greater than a pressure area facing said external hydraulic chamber.

15. The hydraulic lock device as defined in claim 14, wherein said rod-moving hydraulic cylinder comprises a spring elastically urging said rod toward an advance side thereof.

16. The hydraulic lock device as defined in claim 14, wherein said rod-moving hydraulic cylinder comprises a return spring urging said piston member to a retraction side thereof.

17. The hydraulic lock device as defined in claim 5, wherein said rod-moving hydraulic cylinder comprises a spring elastically urging said rod toward an advance side thereof.

18. The hydraulic lock device as defined in claim 17, wherein said rod-moving hydraulic cylinder comprises a return spring urging said piston member to a retraction side thereof.

19. The hydraulic lock device as defined in claim 5, wherein said rod-moving hydraulic cylinder comprises a return spring urging said piston member to a retraction side thereof.

* * * * *